United States Patent

Abrahamsen

[15] 3,670,104

[45] June 13, 1972

[54] CIPHERING METHOD AND APPARATUS

[72] Inventor: Per Reider Abrahamsen, Kjeller, Norway

[73] Assignee: International Standard Electric Corporation, New York, N.Y.

[22] Filed: Dec. 3, 1970

[21] Appl. No.: 94,654

[30] Foreign Application Priority Data

Jan. 16, 1970 Norway ....................151/70

[52] U.S. Cl. ....................178/22, 178/2 R

[51] Int. Cl. ....................H04l 9/00

[58] Field of Search....................178/2 A, 2 B, 2 C, 2 D, 2 E, 178/2 F, 2 R, 23 A, 23 R, 26 A, 22

[56] References Cited

UNITED STATES PATENTS 3,448,206 6/1969 Rossberg....................178/2 R 3,576,952 5/1971 Van Duuren....................178/23 A 3,496,291 2/1970 Meisingset et al....................178/22

*Primary Examiner*—Kathleen H. Claffy

*Assistant Examiner*—Horst F. Brauner

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The present invention is related to a method and apparatus to avoid overprinting at the end of teleprinter lines on page-printing teleprinters when a coding signal is used for enciphering of teleprinter messages. This is accomplished by enciphering the first of three procedure characters (two CARRIAGE RETURN and one LINE FEED) in the normal manner while the next two characters are not enciphered. At the receiving end, the first CARRIAGE RETURN is retrieved as normal, and the next two characters are passed in plain text without deciphering.

8 Claims, 6 Drawing Figures

| A | B | T |
|---|---|---|
| 0 | 0 | 1 |
| 0 | 1 | 1 |
| 1 | 0 | 1 |
| 1 | 1 | 0 |

| $J^t$ | $K^t$ | $R^t$ | $Q^{t+1}$ |
|---|---|---|---|
| 0 | 0 | 0 | 0 |
| 0 | 1 | 0 | 0 |
| 1 | 0 | 0 | 0 |
| 1 | 1 | 0 | 0 |
| 0 | 0 | 1 | $Q^t$ |
| 0 | 1 | 1 | 0 |
| 1 | 0 | 1 | 1 |
| 1 | 1 | 1 | $\bar{Q}^t$ |

Inventor
PER R. ABRAHAMSEN
By [signature]
Attorney

Inventor
PER R. ABRAHAMSEN
By [signature]
Attorney

CIPHERING METHOD AND APPARATUS

CROSS-REFERENCE TO RELATED APPLICATIONS

This application is related to U.S. Pat. No. 3,496,291 issued to K. R. Meisingset et al. on Feb. 17, 1970 and U.S. Pat. No. 3,506,783 issued to I. Mo et al. on Apr. 14, 1970.

BACKGROUND OF THE INVENTION

The invention relates to apparatus and a method used in connection with teleprinter equipment for enciphering and deciphering a plain text. In accordance with procedures, there is included at intervals a combination of two CARRIAGE RETURN characters and one LINE FEED character, and the plain text is transferred from a keyboard teleprinter, or from an automatic transmitter for perforated tape, arranged at the transmitting end, to enciphering equipment at the transmitting end. Each plain text character normally is processed with a coding character such that there from the output of the enciphering equipment is derived a cipher text character for each plain text character, and the cipher text is transferred by conventional means to deciphering equipment at the receiving end where each cipher text character is processed with a coding character corresponding to the coding character used for said character at the transmitting end in order to recover the original plain text character.

When a coding signal is used for enciphering of teleprinter messages, the enciphered output is also random, which means that overprinting occurs on page-printing teleprinters, unless precautions have been taken to avoid it. Normally, this is no drawback with the system, because such enciphered messages usually are transmitted on fixed lines or leased circuits, but in certain switched networks with automatic monitoring, overprinting might be recognized as a non-allowable condition and extra characters inserted, thus destroying the cipher key synchronism. The present invention is related to a method to avoid overprinting at the end of teleprinter lines on page-printing teleprinters.

Format ciphers are already in use. Normally, these work out the enciphered messages as groups of 5-letter words, orderly arranged in lines and verses. The system needs a rather complicated logic to handle the task, the enciphered text will be much longer than the actual plain text and it is necessary that the system comprises some method to stop the reading of plain text while the extra characters are inserted.

SUMMARY OF THE INVENTION

An object of the present system is to avoid overprinting at the end of teleprinter lines in a simplified manner so that the cipher text is exactly as long as the plain text message.

Another object of the invention is to avoid halting or storing the plain text.

A feature of the present invention is that the first one of the three procedure characters (two CARRIAGE RETURN and one LINE FEED) which at intervals are included in the plain text on the transmitting end is detected in a detecting device controlling the enciphering equipment at the transmitting end such that the said first one of the three characters are enciphered in normal manner while the next two of the three procedure characters are not enciphered, whereby the cipher text at intervals includes two of the procedure characters in plain text.

Another feature of the invention is that the first one of the three procedure characters, which character exists in enciphered mode in the cipher text, is deciphered in normal manner at the receiving end whereby it is recovered at plain text and simultaneously detected in a detecting device controlling the deciphering equipment at the receiving end such that the next two characters are handled as plain text characters and thereby appear together with the first one of the three procedure characters.

According to the invention, a property is utilized that is common with most teleprinter messages, the character LINE FEED is almost always preceded by a CARRIAGE RETURN, in most cases also with another CARRIAGE RETURN as well, to cover the delay in the carriage movement. In the chosen system, the operator typing the plain text message will have to print CARRIAGE RETURN, CARRIAGE RETURN, LINE FEED whenever a new line occurs in the telegram. During the enciphering operation, the first CARRIAGE RETURN is enciphered as normal—but it is also detected in such a way as to let the next two characters pass in the plain. During deciphering, the first CARRIAGE RETURN is retrieved as normal, and the detection again results in a plain text passing of the next two characters. The enciphered signal may thus be received by a normal page-printer without causing overprinting at the end of the printed lines.

BRIEF DESCRIPTION OF THE DRAWINGS

Above mentioned and other features and objects of the present invention will clearly appear from the following detailed description of one embodiment of the invention taken in conjunction with the drawings where.

DESCRIPTION OF THE PREFERRED EMBODIMENTS

Figure 1:
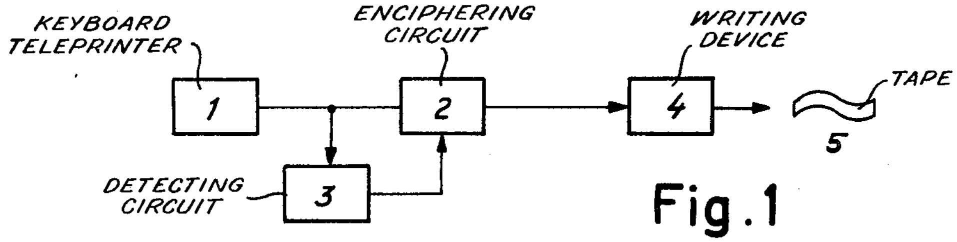
FIGS. 1 and 2 show a block schematic of the transmitting and receiving end respectively.

In FIG. 1 is shown a block schematic of the transmitting end where a plain text signal appears at the output of a block 1 which represents a keyboard teleprinter or an automatic transmitter. The plain text signal is applied to an enciphering circuit 2 in which it is processed with a coding character in accordance with a predetermined rule. The plain text is also applied to a detecting circuit 3 for detections of the procedure character CARRIAGE RETURN. Upon detection of a CARRIAGE RETURN character, the detecting circuit 3 controls the enciphering circuit 2 such that the following two characters, which according to normal procedures should be a second CARRIAGE RETURN character and a LINE FEED character, are not treated with coding character. The two last mentioned characters are therefore passed through the enciphering circuit 2 in the plain. The signal leaving the enciphering circuit 2 may either, in the off-line case, be fed to a writing or punching device 4 for producing a perforated tape 5, or in the on-line case (not shown), be transmitted directly via a transmission line (not shown) to the receiving end.

Figure 2:
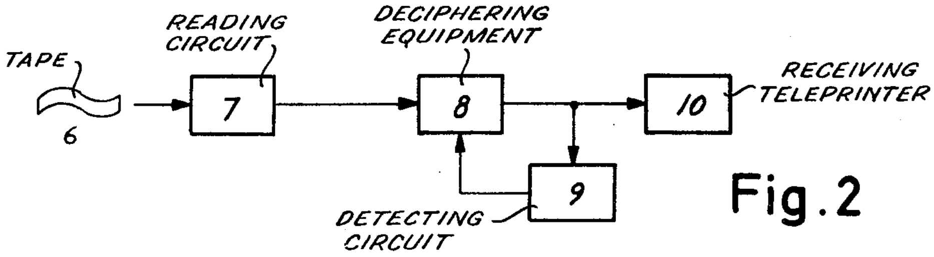

In FIG. 2 is shown a block schematic of the receiving end where an enciphered signal is received and deciphered. In the case of off-line equipment the enciphered signal is received by a normal printing or punching device (not shown) thereby producing a perforated tape 6 containing the enciphered message. The perforated tape 6 is read in a reading circuit 7, the output of which is applied to a deciphering equipment 8. In case of on-line reception (not shown) the enciphered signal received on the line is applied directly to the deciphering equipment 8.

In the deciphering equipment 8 the enciphered signal is processed with a coding signal identical with that used at the transmitting end, such as to recover the original plain text. When a CARRIAGE RETURN character occurs at the output of block 8, this character is detected by a detecting circuit 9 which controls the deciphering equipment 8 such that the following two characters are not processed with coding signal. These next two characters are, as mentioned previously, the last two of the three procedure characters. The signal thus appearing at the output of the deciphering equipment 8 is identical with the original plain text signal and is applied to a receiving teleprinter 10.

It is now obvious that the enciphered signal appearing on the transmission channel may be monitored by and printed on a page teleprinter without overprinting at the end of a line, because the second CARRIAGE RETURN character and the LINE FEED character are left in the plain in the enciphered signal.

Figure 3:
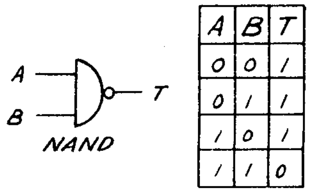
FIGS. 3 and 4 show logic symbols used in the detailed diagram.
Figure 4:
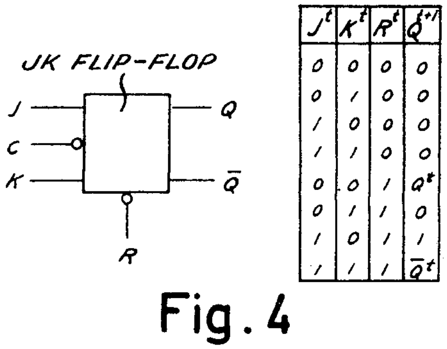

The logic circuits used in the detailed block diagram are shown in FIGS. 3 and 4. FIG. 3 shows a normal NAND-circuit for positive logic. Logic "0" on one or both inputs results in "1" on the output, while logic "1" on both inputs results in a "0" on the output, as shown in the table of combinations. FIG. 4 shows a so-called masterslave JK flip-flop, with operation as shown in the truth table. J and K are the normal signal inputs, and C the clock input, while R is a reset input. Q and $\bar{Q}$ are the "true" and "false" outputs. A logic "0" on the reset input R overrules all other input signals and keeps the flip-flop in state "0" ($Q=0, \bar{Q}=1$).

Figure 5:
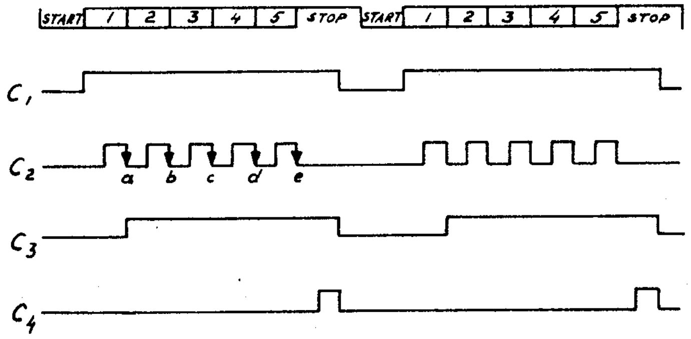
FIG. 5 shows the control waveforms appearing in the detailed diagram.
Figure 6:
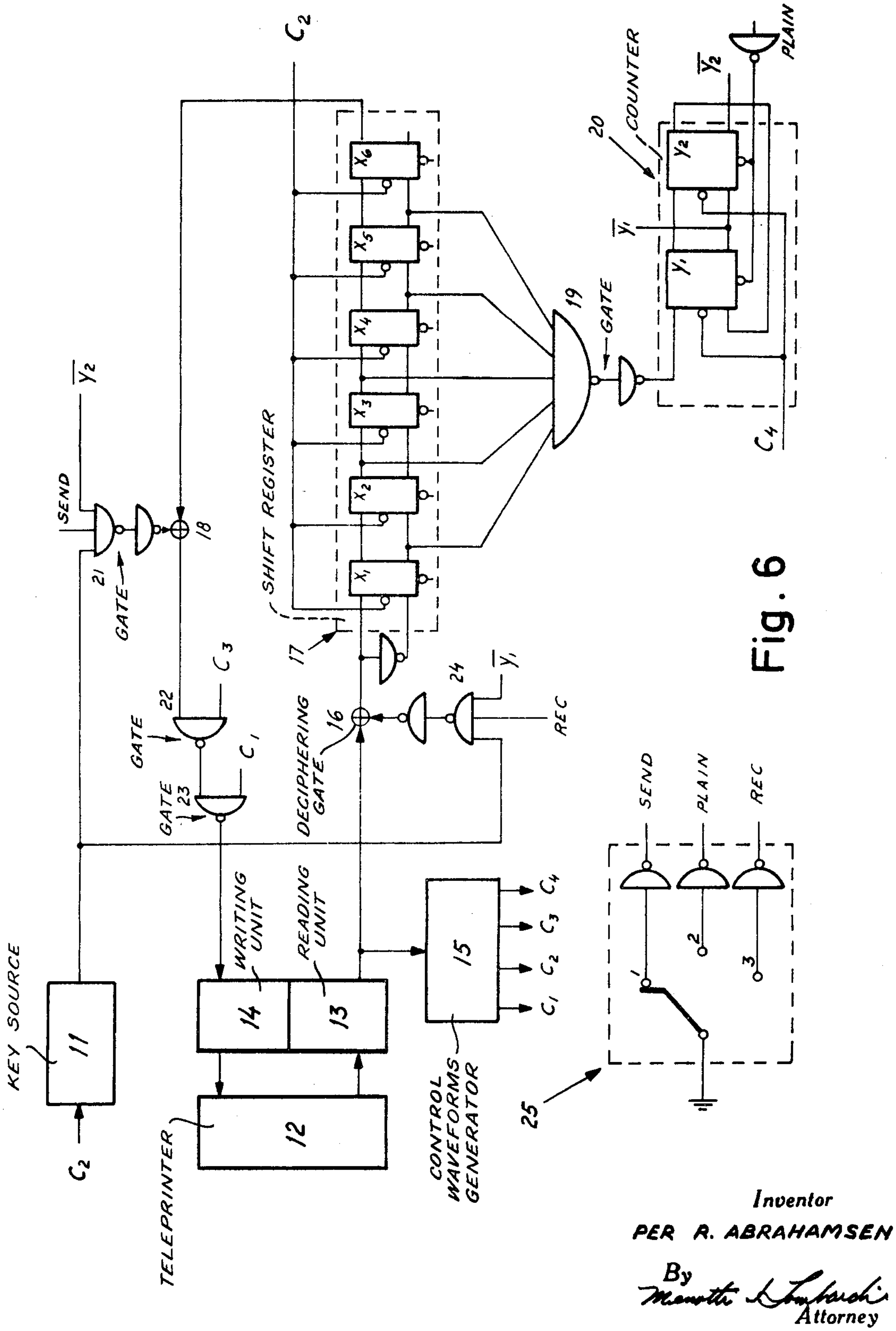
FIG. 6 shows the detailed system logic of a circuit used at both the transmitting and receiving ends.

FIG. 6 shows a detailed block diagram of an embodiment of the invention where off-line mode is used. A key source 11, a teleprinter 12 with reading unit 13 and writing unit 14, and a control waveforms generator 15 are shown as blocks, because their details are not essential for the understanding of the present invention. The necessary control waveforms $C_1$–$C_4$ are shown in FIG. 5.

While FIG. 6 shows equipment to be used at the transmitting end as well as at the receiving end, the simple signal flow shown in FIGS. 1 and 2 shall be traced through FIG. 6.

In the enciphering mode the plain text is written on a normal teleprinter 12, or when the plain text appears as a perforated tape, it is read by the reading unit 13. The plain text characters now appearing in serial form (start pulse—five information bits—stop pulse) is passed directly through a non-active deciphering gate 16 and a shift register 17 to an enciphering gate 18 where it is treated with coding character supplied from the key source 11. A CARRIAGE RETURN character appearing in the plain text is detected by a gate 19 which via a counter 20 controls the enciphering gate 18 via gate 21 to prevent enciphering of the next two characters. The cipher signal leaving the enciphering gate 18 is transferred via gates 22 and 23 to the writing and/or punching unit 14 in this shown off-line circuit.

In the deciphering mode in the shown off-line circuit a perforated cipher tape is read by the reading unit 13, and passed directly to the deciphering gate 16 where it is treated with coding character supplied from the key source 11. The output signal from the deciphering gate 16 is supplied via the shift register 17 through the non-active enciphering gate 18 and the gates 22, 23 to the writing circuit 14 of the teleprinter 12. However, the deciphered signal leaving the deciphering gate 16 is monitored by the detector gate 19 for detection of a CARRIAGE RETURN character. As soon as such a character is detected, the counter 20 through gate 24 controls the deciphering gate 16 to leave the next two characters untreated by coding material.

By means of the $C_2$ clock waveform, the key source 11 is capable of delivering coding signal characters at the same time as the teleprinter presents the 5 information bits.

The teleprinter reading unit 13 transforms "Marks" from the teleprinter into logic "ones," and "Spaces" into logic "-zeros." The start pulse of a teleprinter character is transmitted through the reading unit 13 to the control circuit 15 and starts the generation of control waveforms $C_1$–$C_4$. The upper line in FIG. 5 shows the occurrence of the START and STOP pulses and information bits of teleprinter characters, all referred to the teleprinter send contact. When the $C_1$ waveform is in logic "0,"the output of gate 23 rests on logic "1," thus keeping the teleprinter writing unit 14 in Mark condition during the STOP pulse, which is one bit delayed with respect to the send contact signal. The $C_2$ waveform clocks the information bits from the teleprinter into the shift register 17 ($X_1$–$X_6$) in FIG. 5 at times *a*, *b*, *c*, *d* and *e*, such that at time "*e*," the five information bits are present in $X_1$ through $X_5$ . The $C_3$ waveform is a control signal which is three-position "1" when the five information bits from the former character are to be read from stage $X_6$ of the shift register. The $C_4$ waveform is a single PLAIN pulse which is present when the information contents of a teleprinter character appears in stages $X_1$–$X_5$ of the shift register.

Returning to FIG. 6, the circuit operation is the following: A trhee-position switch 25 controls whether the equipment is going to encipher or decipher a message. In pos. 1, the SEND signal is logic "1," and enciphering is performed. In pos. 2, the !PLAIN variable is logic "1," and the teleprinter relay merely repeats the send contact signals. In pos. 3, the REC signal is logic "1," and deciphering is performed.

Suppose that SEND = "1." When pressing a key on the teleprinter keyboard, the corresponding character is read into $X_1$–$X_5$. At the same time the former character is written out from $X_6$ through gates 18, 22 and 23. If the variable $\bar{Y}_2$ is logic "1," a key character is transferred to gate 18 through gate 21. This is the normal operation and means that the plain text character and the key character are added modulo-2 bit by bit in gate 18, i.e. normal enciphering process. If a CARRIAGE RETURN is detected in $X_1$–$X_5$ as plain text, counter 20 ($Y_1Y_2$) begins counting, because the J-input to $Y_1$ goes high through the detector gate 19. The counting sequence is 00-10-11-01-00 normally, or 00-10-11-01-10 if the third character after the first CARRIAGE RETURN is another CARRIAGE RETURN. This means the $\bar{Y}_2$ is logic zero during two characters thus enciphering is not performed during these two characters. It is up to the operator to make use of this feature in a format procedure by just pushing the buttons CARRIAGE RETURN, CARRIAGE RETURN, LINE FEED—whereby the first CARRIAGE RETURN will be enciphered as normal, while the other two characters will be written out in the plain.

Suppose that REC = "1." The object is now to decipher a message, normally presented to the system as a punched paper tape, which is to be read by the teleprinter reading unit 13. In the receive mode, the deciphering is performed in the gate 16 before the character enters the shift register 17. The key character is presented to gate 16 through gate 24 when the $\bar{Y}_1$ variable is logic "1." Detection of a CARRIAGE RETURN in $X_1$–$X_5$ is done as above, and the counting sequence in $Y_1Y_2$ is exactly the same. This means that the two next characters after a CARRIAGE RETURN are handled as plain text characters, because the $\bar{Y}_1$ variable is logic zero for these two characters. It should be noted that the equipment is designed such that any two characters following a CARRIAGE RETURN appearing in the plain text message will be left in the plain in the cipher text. This means that if the operator unintentionally presses the CARRIAGE RETURN button, the next two characters will not be enciphered. The security is not impaired by this feature, because a third party tapping The line have no means for detecting where the two plain text characters occur.

Although I have described above the invention in connection with specific examples, it is to be clearly understood that it is by way of example only, and not to be considered as a limitation on the scope of the invention as defined in the objects thereof and in the accompanying claims.

I claim:

1. In teleprinter equipment for enciphering and deciphering a plain text having at intervals a combination of two CARRIAGE RETURN characters and one LINE FEED character, where the plain text is transferred from a keyboard teleprinter, or an automatic transmitter for perforated tape, arranged at the transmitting end, to enciphering equipment at the transmitting end, where each plain text character normally is processed with a coding character such that there from the output of the enciphering equipment is derived a cipher text character for each plain text character, and where the cipher text is transferred by means to deciphering equipment at the receiving end where each cipher text character is processed with a coding character corresponding to the coding character used for said character at the transmitting end in order to recover the original plain text character, the method comprising the steps of detecting the first one of the three procedure characters (two CARRIAGE RETURN and one LINE FEED)

at intervals in the plain text on the transmitting end, and controlling the enciphering equipment at the transmitting end such that the said first one of the three characters are enciphered in normal manner while the next two of the three procedure characters are not enciphered, whereby the cipher text at intervals includes two of the procedure characters in plain text.

2. The method for deciphering a plain text enciphered in accordance with claim 1, including the steps of determining the first one of the three procedure characters, which character exists in enciphered mode in the cipher text, to be deciphered in normal manner at the receiving end so that it is recovered as plain text, and simultaneously controlling the deciphering equipment at the receiving end so that the next two characters are handled as plain text characters and thereby appear together with the first one of the three procedure characters.

3. Apparatus in connection with teleprinter equipment for enciphering and deciphering a plain text which includes a combination of two CARRIAGE RETURN characters and one LINE FEED character, where the plain text is transferred from a keyboard teleprinter, or an automatic transmitter for perforated tape, arranged at the transmitting end, to enciphering equipment at the transmitting end, where each plain text character normally is processed with a coding character such that there from the output of the enciphering equipment is derived a cipher text character for each plain text character, and where the cipher text is transferred by means to deciphering equipment at the receiving end where each cipher text character is processed with a coding character corresponding to the key material used for said character at the transmitting end in order to recover the original plain text character, the apparatus comprising means for detecting the first one of the three procedure characters (two CARRIAGE RETURN and one LINE FEED) included in the plain text on the transmitting end and for controlling the enciphering equipment at the transmitting end such that the said first one of the three characters are enciphered in normal manner while the next two of the three procedure characters are not enciphered, whereby the cipher text at intervals includes two of the procedure characters in plain text.

4. Apparatus according to claim 3, wherein the first one of the three procedure characters, which character exists in enciphered mode in the cipher text, is deciphered in normal manner at the receiving end whereby it is recovered as plain text, and wherein means for simultaneously detecting and controlling deciphering equipment at the receiving end is included such that the next two characters are handled as plain text characters and thereby appear together with the first one of the three procedure characters.

5. Apparatus according to claim 4, wherein said means for detecting and controlling the enciphering equipment includes a detecting device at the transmitting end, an associated counting device connected to deliver a control signal to an encipher control gate, whereby the enciphering process is stopped for the two characters following a CARRIAGE RETURN character.

6. Apparatus according to claim 5, wherein the equipment at the transmitting end includes a switch having three positions SEND, PLAIN and RECEIVE by means of which the encipher control gate is enabled.

7. Apparatus according to claim 4, wherein said means for simultaneously detecting and controlling deciphering equipment includes another detecting device at the receiving end and a counting device connected to deliver a control signal to a decipher control gate whereby the deciphering process is stopped for the two characters following a CARRIAGE RETURN character.

8. Apparatus according to claim 7, wherein the equipment at the receiving end includes a switch having three positions SEND, PLAIN and RECEIVE by means of which the counter is blocked and the decipher control gate is enabled.

* * * * *